United States Patent [19]
Sato

[11] Patent Number: 5,461,681
[45] Date of Patent: Oct. 24, 1995

[54] IMAGE DATA PROCESSING APPARATUS

[75] Inventor: Hiroaki Sato, Yokohama, Japan

[73] Assignee: Canon Kabushiki Kaisha, Tokyo, Japan

[21] Appl. No.: 264,249

[22] Filed: Jun. 22, 1994

Related U.S. Application Data

[63] Continuation of Ser. No. 75,347, Jun. 14, 1993, abandoned, which is a continuation of Ser. No. 766,218, Sep. 27, 1991, abandoned, which is a division of Ser. No. 550,224, Jul. 9, 1990, Pat. No. 5,073,966, which is a continuation of Ser. No. 338,333, Apr. 13, 1989, abandoned, which is a continuation of Ser. No. 31,210, Mar. 30, 1987, abandoned, which is a continuation of Ser. No. 605,670, Apr. 30, 1984, abandoned.

[30] Foreign Application Priority Data

May 10, 1983 [JP] Japan ................................ 58-80085

[51] Int. Cl.$^6$ ............................................ G06K 9/36
[52] U.S. Cl. ............................................ 382/234; 258/426
[58] Field of Search ........................... 382/56, 54, 57; 358/296, 456, 426, 261.2, 261.3; 348/411, 348

[56] References Cited

U.S. PATENT DOCUMENTS

| | | | |
|---|---|---|---|
| 4,441,208 | 4/1984 | Iida | 382/56 |
| 4,496,989 | 1/1985 | Hirosawa | 358/296 |
| 4,566,127 | 1/1986 | Sekiya et al. | 382/56 |
| 4,628,366 | 12/1986 | Yamada | 358/280 |
| 4,665,555 | 5/1987 | Alker et al. | 382/57 |
| 4,672,679 | 6/1987 | Freeman | 382/56 |
| 4,727,589 | 2/1988 | Hirose et al. | 382/56 |
| 5,038,389 | 8/1991 | Mizuno | 382/56 |

*Primary Examiner*—Joseph Mancuso
*Attorney, Agent, or Firm*—Fitzpatrick, Cella, Harper & Scinto

[57] ABSTRACT

An image data processing apparatus comprises output means for outputting an image data for each pixel and compression means for compressing the image data supplied from the output means to an image data of a predetermined number of bits. The compression means compresses the image data in accordance with a dot pattern having a predetermined number of tone levels.

14 Claims, 8 Drawing Sheets

| INPUT PIX DATA a | CO-ORDINATES X,Y (2×2 AS ONE UNIT) | OUTPUT DOT PATTERN b |
|---|---|---|
| 1 1 0 | 1 , 1 |  |
|  | 1 , 2 |  |
|  | 2 , 1 |  |
|  | 2 , 2 |  |

FIG. 6A
| CO-ORDI-NATES X,Y | INPUT PIX DATA  a | OUTPUT CODE DATA c |
|---|---|---|
| 1 , 1 | 0 ~ 38 | 0 |
|  | 39 ~ 46 | 1 |
|  | 47 ~ 102 | 2 |
|  | 103 ~ 110 | 3 |
|  | 111 ~ 134 | 4 |
|  | 135 ~ 142 | 5 |
|  | 143 ~ 230 | 6 |
|  | 231 ~ 238 | 7 |
|  | 239 ~ 255 | 8 |
FIG. 6B
OUTPUT CODE DATA
0    1    2    3    4
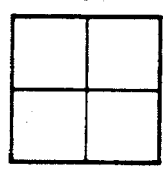 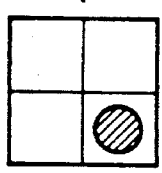 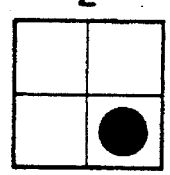 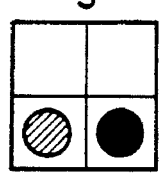 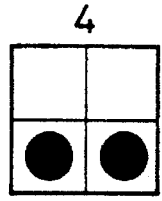
5    6    7    8
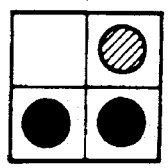 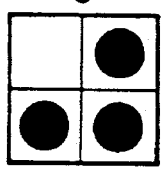 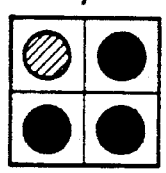 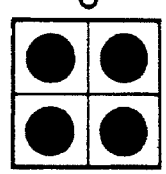

FIG. 7A

| CO-ORDI-NATES X,Y | INPUT PIX DATA a | OUTPUT CODE DATA c | CO-ORDI-NATES X,Y | INPUT PIX DATA a | OUTPUT CODE DATA c |
|---|---|---|---|---|---|
| 1,1 | 0 ~ 38 | 0 | 2,1 | 0 ~ 6 | 0 |
|  | 39 ~ 46 | 1 |  | 7 ~ 14 | 1 |
|  | 47 ~ 102 | 2 |  | 15 ~ 70 | 2 |
|  | 103 ~ 110 | 3 |  | 71 ~ 78 | 3 |
|  | 111 ~ 134 | 4 |  | 79 ~ 166 | 4 |
|  | 135 ~ 142 | 5 |  | 167 ~ 174 | 5 |
|  | 143 ~ 230 | 6 |  | 175 ~ 198 | 6 |
|  | 231 ~ 238 | 7 |  | 199 ~ 206 | 7 |
|  | 239 ~ 255 | 8 |  | 207 ~ 255 | 8 |
| 1,2 | 0 ~ 54 | 0 | 2,2 | 0 ~ 22 | 0 |
|  | 55 ~ 62 | 1 |  | 23 ~ 30 | 1 |
|  | 63 ~ 86 | 2 |  | 31 ~ 118 | 2 |
|  | 87 ~ 94 | 3 |  | 119 ~ 126 | 3 |
|  | 95 ~ 182 | 4 |  | 127 ~ 150 | 4 |
|  | 183 ~ 190 | 5 |  | 151 ~ 156 | 5 |
|  | 191 ~ 214 | 6 |  | 159 ~ 246 | 6 |
|  | 215 ~ 222 | 7 |  | 247 ~ 254 | 7 |
|  | 223 ~ 255 | 8 |  | 255 | 8 |

FIG. 7B

| CO-ORDI-NATES X,Y | OUTPUT CODE DATA c | OUTPUT DOT PATTERN a' | CO-ORDI-NATES X,Y | OUTPUT CODE DATA c | OUTPUT DOTE PATTERN a' |
|---|---|---|---|---|---|
| 1,1 | 0 | 19 | 2,1 | 0 | 3 |
|  | 1 | 42 |  | 1 | 10 |
|  | 2 | 74 |  | 2 | 42 |
|  | 3 | 106 |  | 3 | 74 |
|  | 4 | 122 |  | 4 | 122 |
|  | 5 | 138 |  | 5 | 170 |
|  | 6 | 186 |  | 6 | 186 |
|  | 7 | 234 |  | 7 | 202 |
|  | 8 | 247 |  | 8 | 231 |
| 1,2 | 0 | 27 | 2,2 | 0 | 11 |
|  | 1 | 58 |  | 1 | 26 |
|  | 2 | 74 |  | 2 | 74 |
|  | 3 | 90 |  | 3 | 122 |
|  | 4 | 138 |  | 4 | 138 |
|  | 5 | 186 |  | 5 | 154 |
|  | 6 | 202 |  | 6 | 202 |
|  | 7 | 218 |  | 7 | 250 |
|  | 8 | 239 |  | 8 | 255 |

FIG. 8

| OUTPUT CODE DATA c | CO-ORDI-NATES (1,1) | DECODED DOT PATTERN (1,2) | (2,1) | (2,2) |
|---|---|---|---|---|
| 0 | | | | |
| 1 | | | | |
| 2 | | | | |
| 3 | | | | |
| 4 | | | | |
| 5 | | | | |
| 6 | | | | |
| 7 | | | | |
| 8 | | | | |

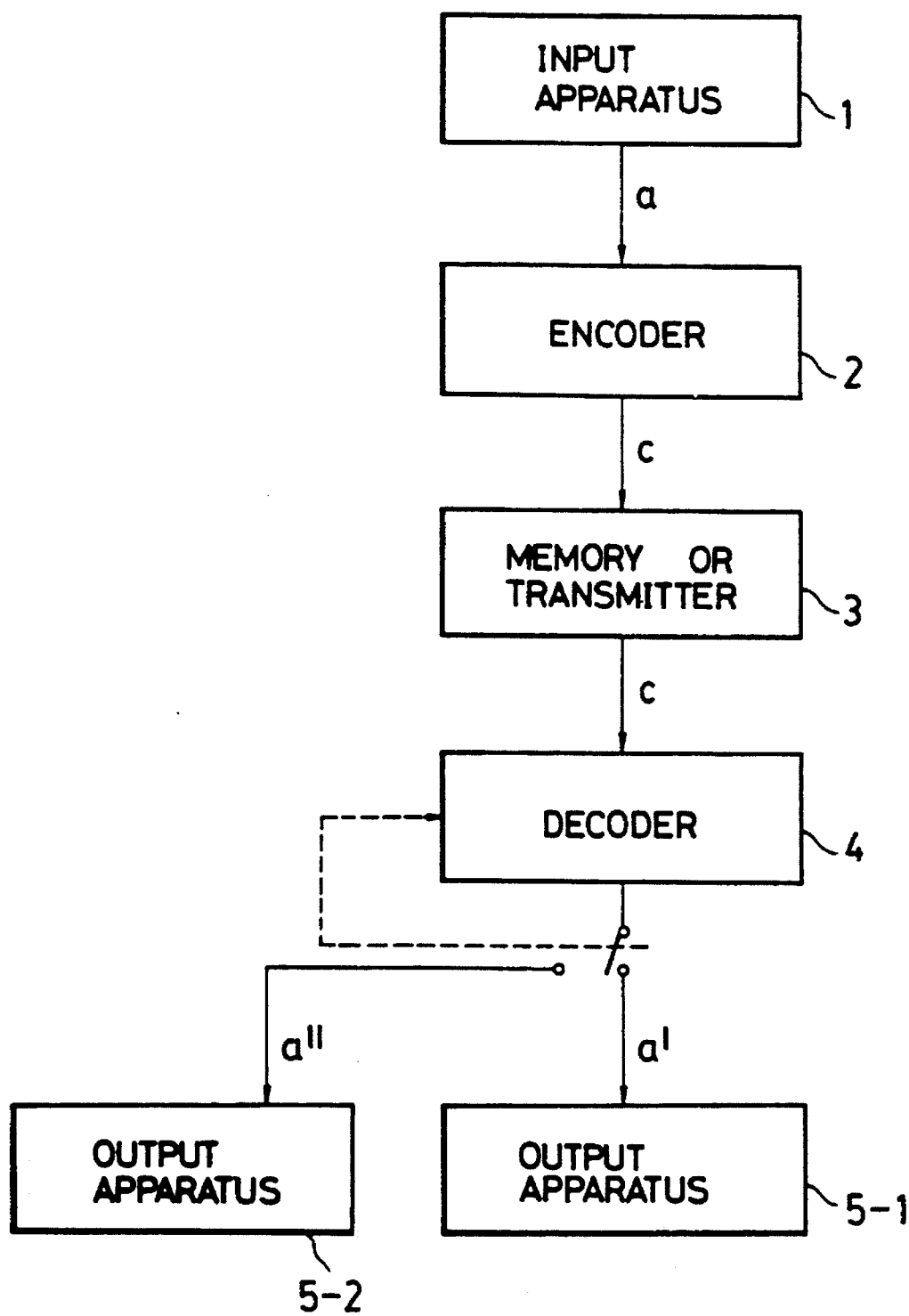

IMAGE DATA PROCESSING APPARATUS

This application is a continuation of application Ser. No. 08/075,347 filed on Jun. 14, 1993, now abandoned which is a continuation of prior application Ser. No. 07/766,218 filed on Sep. 27, 1991, now abandoned which is divisional of prior application Ser. No. 07/550,224 filed on Jul. 9, 1990, now U.S. Pat. No. 5,073,966, which is a continuation of prior application Ser. No. 07/338,333 filed on Apr. 13, 1989 which is a continuation of prior application Ser. No. 07/031,210 filed on Mar. 30, 1987, now abandoned which is a continuation of prior application Ser. No. 06/605,670 filed on Apr. 30, 1984, now abandoned.

BACKGROUND OF THE INVENTION

1. Field of the Invention

The present invention relates to an image data processing apparatus which processes an input image data sampled for each pixel.

2. Description of the Prior Art

An image processing apparatus which uses an image processing system called a dither method in which an input image data for each pixel is processed by one element of a threshold matrix (dither matrix) to convert it to one-bit or multi-bit data representing a binary or multi-value dot, has been known. An image processing apparatus which uses an image processing system called a density pattern method in which an input image data for each pixel is processed by an entire threshold matrix to produce a dot pattern representing the input data, has also been known.

In the image processing apparatus which uses the density pattern method, the input 6 to 8-bit pixel data is transmitted to an output device such as a printer and it is converted to a dot pattern in the output device, or the input pixel data is stored in a memory and then it is converted to the dot pattern in the output device.

Accordingly, in such image processing device, the input pixel data must be transmitted or stored as it is in spite of the fact that the number of tone levels in the output device is smaller than that of the input pixel data.

SUMMARY OF THE INVENTION

It is an object of the present invention to provide an image data processing apparatus which can represent an image data by a smaller number of bits than the number of bits of an input image data and store or transmit it.

It is another object of the present invention to provide an image data processing apparatus which can reproduce a high quality image.

It is other object of the present invention to provide an image data processing apparatus which comprises an input image data such that an image can be moved while it is compressed.

It is other object of the present invention to provide an image data processing apparatus which can reproduce a high quality of image for different output devices.

It is a further object of the present invention to provide an image data processing apparatus which encodes an image data in accordance with the number of output tone levels.

BRIEF DESCRIPTION OF THE DRAWINGS

FIG. 6A shows a relation between the value of the input pixel of FIG. 4 and an output code C when the coordinates are (1, 1), FIG. 6B shows a relation between the code C of FIG. 6A and a dot pattern, FIG. 7A shows a content of data conversion in the encoder 2, FIG. 7B shows a content of data conversion in a decoder 4, FIG. 8 shows a dot pattern stored in a memory of an output device 5, and FIG. 9 shows another embodiment.

DETAILED DESCRIPTION OF THE PREFERRED EMBODIMENTS

Figure 1:
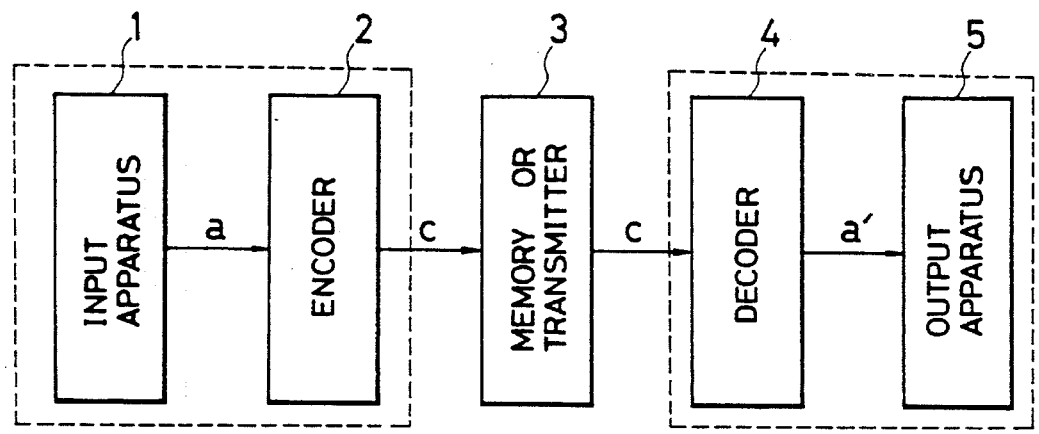
FIG. 1 is a block diagram showing a configuration of an image input/output system to which an image data processing apparatus of the present invention is applied.

FIG. 1 shows a configuration of an image input/output system to which the image data processing apparatus of the present invention is applied. Numeral 1 denotes an image input device such as a reader which reads an image data and sends it out as an input image data sampled for each pixel, numeral 2 denotes an encoder (image data compressor) for encoding and compressing the input image data, numeral 3 denotes a transmitter for transmitting the data compressed by the encoder 2 or a memory for storing the compressed data, numeral 4 denotes a decoder for decompressing the compressed data supplied from the transmitter/memory 3, and numeral 5 denotes an image output device such as a CRT display or a printer which outputs the image data decompressed by the decoder 4. The printer may be a laser beam printer. The image data read by the input device 1 is compressed by the encoder 2 and the compressed data is transmitted or stored by the unit 3 and decoded by the decoder 4 to the data which complies with the output device 5. The output device 5 outputs the dot pattern in accordance with the data supplied from the decoder 4.

Figure 2:
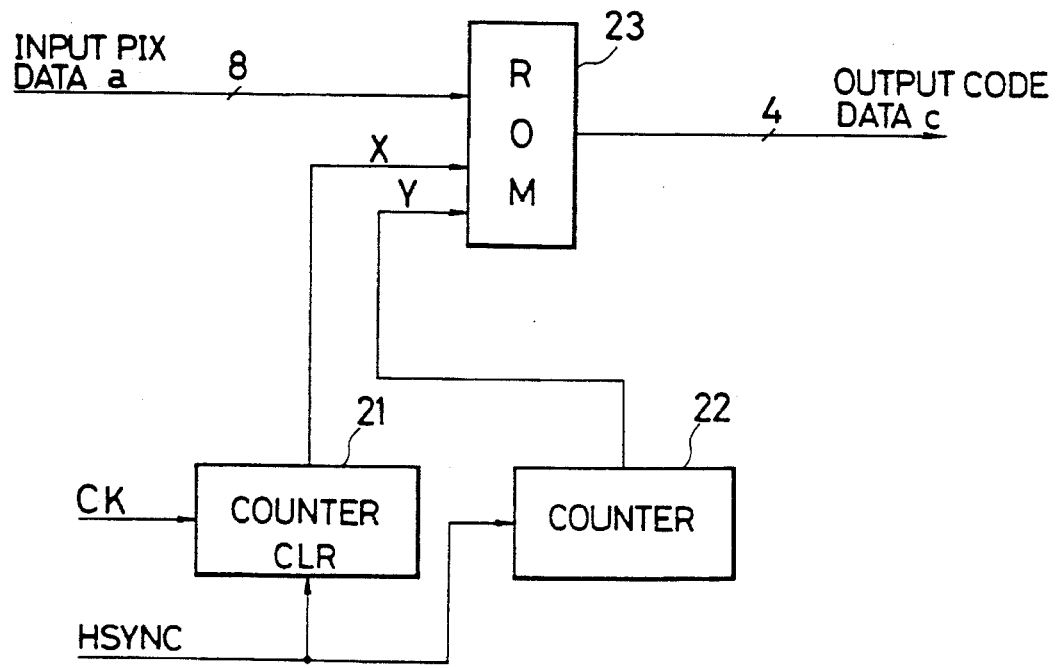
FIG. 2 is a block diagram showing a configuration of an encoder 2 of FIG. 1, FIGS. 3A and 3B show configurations of threshold matrices used in the present embodiment.

FIG. 2 shows a circuit configuration of the encoder 2 of FIG. 1. Numerals 21 and 22 denote counters and numeral 23 denotes a read-only memory (ROM).

In the present embodiments, an input image data a and outputs from the counters 21 and 22 are used as an address data to access the ROM 23 to read out a code data C (to be described later). For a sake of easy understanding, it is assumed that a threshold matrix is stored in the ROM 23. In a first step, the input image data is compared with the threshold matrix to produce a dot pattern. In a second step, the compressed code data C is obtained from the dot pattern. The counter 21 counts a pixel clock CK for inputting the image data to switch a threshold of the threshold matrix. It is reset by a horizontal synchronization signal $H_{SYNC}$. Similarly, the counter 22 counts the horizontal synchronization signal to switch the threshold of the threshold matrix. Accordingly, row and column coordinates in the threshold matrix are defined by the output signals of the counter 21 and 22.

(i) Step 1

Figure 3A:
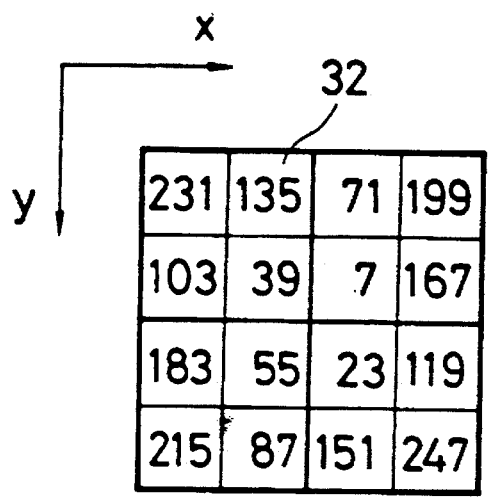
Figure 3B:
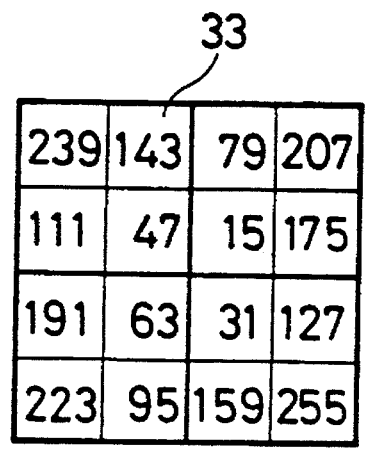

FIGS. 3A and 3B show examples of the threshold matrices stored in the ROM 23. In the present embodiment, the input image data is ternarized by a pair of threshold matrices 32 and 33. An arrow X indicates a horizontal coordinate in the matrix and an arrow Y indicates a vertical coordinate in the matrix. Thus, the thresholds of the threshold matrices 32 and 33 are represented by $T_1(x, y)$ and $T_2(x, y)$, respectively.

Figure 4:
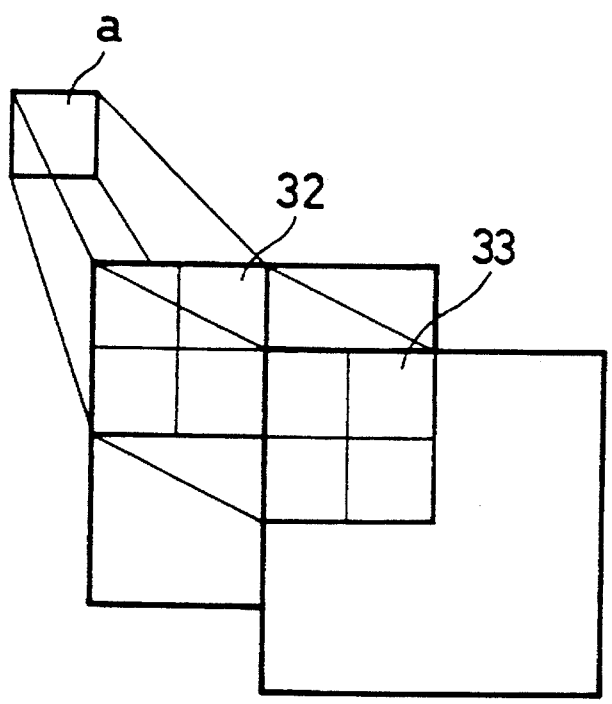
FIG. 4 shows correspondence between an input pixel and the threshold matrices of FIGS. 3A and 3B.

FIG. 4 shows a correspondence between the input image data a of FIG. 2 and the threshold matrices 32 and 33 of FIG. 3. As shown in FIG. 4, the 8-bit input image data a is compared with four thresholds $T_1(x, y)$ and $T_2(x, Y)$ (where x and y are coodinates in the matrix) corresponding to the threshold matrices 32 and 33, and it is converted to an output b=2 if $a \geq T_1(x, y)$ and $a \geq T_2(x, y)$ to an output b=1 if $T_1(x, y) \geq a > T_2(x, y)$ or $T_2(x, y) \geq a > T_1(x, y)$, and to an output b=0 if $a < T_1(x, y)$ and $a < T_2(x, y)$. The output b=0 represents non-dotting, the output b=1 represents dotting with a one-half density and the output b=2 represents dotting with a full density. In the present embodiment, the half density can be attained by a pulse width modulation.

Figure 5:
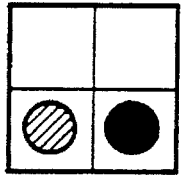
FIG. 5 shows a relation between coordinates and an output dot when an input pixel of FIG. 4 has a value 110.
Figure 5:
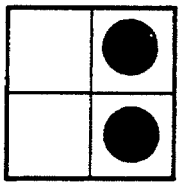
Figure 5:
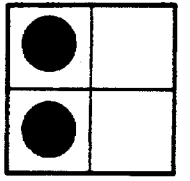
Figure 5:
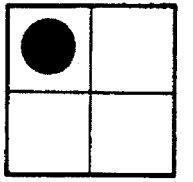

FIG. 5 shows a relation between the coordinates of the threshold matrices 32 and 33 and an output b when the input pixel data a of FIG. 4 is "110". The coordinate column indicates coordinates (x, y) with 2×2=4 pixels being one unit. For example, coordinate (1, 1) indicate coordinates of four thresholds of the left-top corners of the threshold matrices 32 and 33, and coordinates (1, 2) indicate coordinates of four thresholds of the left-bottom corners of the threshold matrices 32 and 33 (see FIGS. 3A and 3B). The coordinates (x, y) are switched by the counter 21 or the counter 22. As the counter 21 is incremented by one, the coordinate x is switched alternately. Similarly, as the counter 22 is incremented by one, the coordinate y is switched alternately. As shown in FIGS. 3A and 3B, at the left-top pixel of the coordinates (1, 1), $T_1=231$ and $T_2=239$. Accordingly, $a < T_1 < T_2$ and the output b is "0" (non-dotting). Similarly, at the left-bottom pixel of the coordinates (1, 1), $T_1(=103) < a(=110) < T_2(=111)$ and the output b is "1" (hatched circle), at the right-top pixel, $a(=110) < T_1(=135) < T_2(=143)$ and the output b is "0" (non-dotting), and at the right-bottom pixel, $a(=110) > T_1(=39)$ and $a(=110) > T_2(=47)$ and the output b is "2" (black dot). In a similar manner, dot patterns shown in the output column are obtained.

(ii) Step 2

FIGS. 6A and 6B show relations between the value a of the input coordinate data 31 of FIG. 4 and the output code C when the x coordinate is 1 and the y coordinate is 1. FIG. 6B shows a relation between the dot patterns shown in the output column of FIG. 5 and the output codes C. For example, when the input value a is 110, the output code C is 3.

FIG. 7A shows a relation between the input pixel data a of FIG. 4 and the output code C at all points of the coordinates. For example, the value of the output code C at the coordinates (x, y)=(1, 1) indicates the dot pattern of FIG. 6B. As seen from FIG. 7A, for a given input image data a, the output code C differs as the coordinates (x, y) change. For example, when the image data a is 110, the output code C is 3 at the coordinates (1, 1), and it is 4 at the coordinates (2, 1). This is due to the fact that the values of the threshold matrices shown in FIGS. 3A and 3B vary from coordinates to coordinates.

In this manner, the 8-bit input pixel data a supplied from the input device 1 is applied to the encoder 2 and converted to the ternary dot output b in accordance with the thresholds in the threshold matrices 32 and 33 corresponding to the input pixel data a, and further converted to the 4-bit code data C as shown in FIG. 7A in accordance with the 4-pixel dot pattern of the dot output b. Accordingly, the data is compressed to one half of the data quantity required by the prior art apparatus, when the data is stored or transmitted.

Since the table such as the ROM 23 is actually used as described above, the coordinate position signal which is the output from the counters 21 and 22 and the 8-bit input image data (input pixel data) from the input device 1 are supplied to the ROM 23 as the address data, and the 4-bit code C is read from the ROM 23 as the compressed image data.

Accordingly, the same steps as the steps 1 and 2 described above are eventually carried out.

The 4-bit code data C supplied from the encoder 2 to the memory/transmitter 3 is applied to the decoder 4 through the unit 3. In the decoder 4, the code data C is decoded to an 8-bit signal a' in accordance with the coordinates and the decoded signal is supplied to the output device 5.

The decoder 4 has the counters and the memory (table) shown in FIG. 2. It switches the coordinates each time when the code data C is inputted, to produce the signal a'. The output device 5 ternarize the output signal a' by the threshold matrices 31 and 32 to assure complete decoding.

The output device 5 has a memory which stores the dot patterns and a counter for switching the coordinates, and outputs the dot pattern in accordance with the signal a' and the coordinates when the signal a' is inputted. Since the output signal a' applied to the output device 5 is an average of the input signals a, the tonality can be well reproduced even by an output device having a slightly different threshold matrix.

In the present embodiment, the 4-bot code C is decoded to the 8-bit pixel data a' by the decoder 4 because it is assumed that the output device 5 handles the 8-bit input signal. If the output device 5 can handle the 4-bit dot pattern, the decoder 4 may not be necessary. In this case, the output device 5 may have a memory which stores the dot patterns shown in FIG. 8 and a counter for switching the coordinates. The output device 5 selects the dot pattern in accordance with the code data C and the coordinates when the code data C is inputted. The memory may be a ROM, and the code data C and the output of the counter are used as the address data to access the ROM to output the dot pattern.

Since the output device selects the dot pattern in accordance with the code data C and the coordinates when the code data C is inputted, the image can be reproduced with the number of tone levels larger than that obtainable by four bits although the transmitted code data C is the 4-bit data.

Thus, in the present embodiment, the image data quantity to be transmitted, stored, recorded or displayed can be readily reduced with a very simple circuit configuration.

In the present embodiment, the input pixel data is compared with the 2×2 elements of the 4×4 threshold matrix, taking a balance between the resolution power of the input device and the resolution power of the output device into consideration. In the present embodiment, since the resolution power of the output device is higher than that of the input device, each pixel of the input image data is compared with the multi-elements of the threshold matrix to assure the reproduction of the image with high resolution and high tonality.

FIG. 9 shows another embodiment, in which when output devices are selected, the ROM in the decoder 4 is switched in response to the selection so that it produces an output a" for a second output device 5-2. Thus, a high quality of reproduced image is obtained with the different output device.

As described above, according to the present invention, the data can be readily compressed by using the code representing the dot pattern. Further, since the input pixel data is compressed and the compressed data is transmitted to the output device or stored in the memory, the communication line can be saved or the memory capacity can be reduced. The present invention is, therefore, particularly effective in a facsimile machine.

Further, since the present system does not use a difference between the data or serial numbers as opposed to the prior art method, the image can be moved with the compressed data without decoding. In this case, however, the distance of the movement of the image is an integer multiple of a size of the threshold matrix to prevent the destroy of the threshold pattern, but this is practically acceptable because the image can be moved at a pitch of 0.8 mm or 0.4 mm since an ordinary output device has a pixel density of approximately 0.1 mm per pixel and the threshold matrix of 8×8 or 4×4 size.

The present invention is not limited to the illustrated embodiments but many variations and modifications can be made within a scope of the claim.

What I claim is:

1. An image data processing apparatus which receives coded image data and decodes the coded image data and which provides decoded image data to a selected one of a first output apparatus for forming an image in accordance with decoded image data and a second output apparatus for forming an image in accordance with decoded image data, said image data processing apparatus comprising:

receiving means for receiving coded image data;

decoding means for decoding the coded image data received by said receiving means in accordance with one of a plurality of decoding methods, and for outputting decoded image data; and selecting means for selecting output of decoded image data to one of the first and second output apparatuses, wherein said decoding means decodes the coded image data (1) by using a first decoding method appropriate for the first output apparatus when said selecting means selects output to the first output apparatus and (2) by using a second, different decoding method appropriate for the second output apparatus when said selecting means selects output to the second output apparatus, to provide to each of the first and second output apparatuses, when output thereto is selected, decoded image data appropriately decoded from the same coded image data to form a high quality image.

2. An apparatus according to claim 1, wherein said receiving means comprises a memory.

3. An apparatus according to claim 1, wherein said decoding means comprises a plurality of memories for storing information relating to the decoding by said decoding means, and wherein said decoding means uses, in decoding, one of said plurality of memories selected in accordance with the selection by said selecting means.

4. An apparatus according to claim 1, further comprising the first and second output apparatuses, wherein each of said first and second output apparatus includes an output memory storing a dot pattern.

5. An apparatus according to claim 1, wherein said apparatus comprises a facsimile apparatus.

6. An apparatus according to claim 1, further comprising the first and second output apparatuses, wherein one of said first and second output apparatus is a laser printer.

7. An apparatus according to claim 1, further comprising the first and second output apparatuses, wherein one of said first and second output apparatus is a display.

8. An image data processing method for receiving coded image data, decoding the coded image data and providing decoded image data to a first output apparatus for forming an image in accordance with decoded image data and a second output apparatus for forming an image in accordance with decoded image data, said image data processing method comprising:

a receiving step of receiving coded image data;

a first decoding step of decoding the coded image data received in said receiving step by using a first decoding method appropriate for the first output apparatus to provide first decoded image data; and a second decoding step of decoding the same coded image data as decoded in said first decoding step by using a second, different decoding method appropriate for the second output apparatus to provide second decoded image data, thereby providing to each of the first and second output apparatuses decoded image data appropriately decoded from the same coded image data to form a high quality image, wherein said first decoding step is performed when decoded image data is provided to the first decoding apparatus while said second decoding step is performed when decoded image data is provided to the second decoding apparatus.

9. A method according to claim 8, wherein the coded image data is received by a memory.

10. A method according to claim 8, wherein the coded image data is decoded by using a plurality of memories for storing information relating to decoding of the coded image data.

11. A method according to claim 8, further comprising using the first and second output apparatuses, wherein each of the first and second output apparatuses includes an output memory storing a dot pattern.

12. A method according to claim 8, further comprising using the first and second output apparatuses, wherein one of the first and second output apparatuses is a laser printer.

13. A method according to claim 8, wherein one of the first and second output apparatuses is a display.

14. A method according to claim 8, wherein said method is used by a facsimile apparatus.

* * * * *